United States Patent
Apfelbaum et al.

(10) Patent No.: US 10,534,742 B2
(45) Date of Patent: *Jan. 14, 2020

(54) HOT-PLUG OF DEVICES IN VIRTUALIZED COMPUTER SYSTEMS

(71) Applicant: Red Hat Israel, Ltd., Ra'anana (IL)

(72) Inventors: Marcel Apfelbaum, Ra'anana (IL); Michael Tsirkin, Yokneam Yillit (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,741

(22) Filed: Oct. 23, 2018

(65) Prior Publication Data

US 2019/0057057 A1   Feb. 21, 2019

Related U.S. Application Data

(63) Continuation of application No. 15/229,944, filed on Aug. 5, 2016, now Pat. No. 10,133,699.

(51) Int. Cl.
*G06F 13/40* (2006.01)
*G06F 9/455* (2018.01)
*G06F 13/42* (2006.01)

(52) U.S. Cl.
CPC ...... *G06F 13/4081* (2013.01); *G06F 9/45558* (2013.01); *G06F 13/4282* (2013.01); *G06F 2009/45583* (2013.01)

(58) Field of Classification Search
CPC ............... G06F 9/4413; G06F 9/45558; G06F 13/4081; G06F 13/4282; G06F 2009/45579; G06F 2009/45583
See application file for complete search history.

(56) References Cited

U.S. PATENT DOCUMENTS 7,424,566 B2   9/2008 Manula et al.
7,610,431 B1   10/2009 Watkins et al.
(Continued)

OTHER PUBLICATIONS

"Chapter 10. Guest virtual machine device configuration," Red Hat Enterprise Linux, Virtualization Administration Guide, copyright 2016, 30 pages, Red Hat, Inc., downloaded from https://access.redhat.com/documentation/en-US/Red_Hat_Enterprise_Linux/6/html/Virtualization_Administration_Guide/chap-Guest_virtual_machine_device_configuration.html on Apr. 29, 2016.
(Continued)

*Primary Examiner* — Glenn A. Auve
(74) *Attorney, Agent, or Firm* — Womble Bond Dickinson (US) LLP; Daniel E. Ovanezian

(57) ABSTRACT

A system and method for enabling hot-plugging of devices in virtualized systems. A hypervisor obtains respective values representing respective quantities of a resource for a plurality of virtual root buses of a virtual machine (VM). The hypervisor determines a first set of address ranges of the resource that are allocated for one or more virtual devices attached to at least one of the plurality of virtual root buses. The hypervisor determines, in view of the first set of allocated address ranges, a second set of address ranges of the resource available for attaching one or more additional virtual devices to at least one of the plurality of virtual root buses. The hypervisor assigns to the plurality of virtual root buses non-overlapping respective address ranges of the resource within the second set.

20 Claims, 7 Drawing Sheets

(56) References Cited

U.S. PATENT DOCUMENTS

| | | | |
|---|---|---|---|
| 8,359,415 B2 | 1/2013 | Brown et al. | |
| 8,521,941 B2 | 8/2013 | Regula | |
| 8,533,379 B2 | 9/2013 | Evoy et al. | |
| 8,719,483 B2 | 5/2014 | Hidaka | |
| 9,043,562 B2* | 5/2015 | Fahrig | G06F 9/45533 |
| | | | 711/153 |
| 9,129,123 B2 | 9/2015 | Mooring | |
| 9,244,874 B2 | 1/2016 | Hearn et al. | |
| 9,286,258 B2* | 3/2016 | Gardiner | G06F 13/4045 |
| 10,133,699 B2* | 11/2018 | Apfelbaum | G06F 9/4413 |
| 2003/0204648 A1* | 10/2003 | Arndt | G06F 9/544 |
| | | | 710/5 |
| 2011/0029693 A1 | 2/2011 | Brinkmann et al. | |
| 2013/0076768 A1* | 3/2013 | Chakraborty | G06T 1/60 |
| | | | 345/543 |
| 2015/0212841 A1 | 7/2015 | Tsirkin et al. | |

OTHER PUBLICATIONS

"*Guide*Passthrough Entire PCI USB Controller," Lime Technology—unRAID Server Community, posted Dec. 9, 2014, 13 pages, downloaded from https://lime-technology.com/forum/index.php?topic=36768.0 on Apr. 29, 2016.

"How can the linux kernel be forced to enumerate the PCI-e bux?," Stack Overflow, asked Sep. 13, 2012, 2 pages, downloaded from http://stackoverflow.com/questions/12414024/how-can-the-linux-kernel-be-forced-to-enumerate-the-pci-e-bus on Apr. 29, 2016.

Kristiansen, L.B., "PCIe Device Lending," Master's Thesis, Department of Informatics, University of Oslo, May 11, 2015, 94 pages.

* cited by examiner

HOT-PLUG OF DEVICES IN VIRTUALIZED COMPUTER SYSTEMS

CROSS-REFERENCE TO RELATED APPLICATIONS

This application is a continuation of U.S. patent application Ser. No. 15/229,944, filed on Aug. 5, 2016. The disclosure of the above-referenced application is hereby incorporated by reference in its entirety.

TECHNICAL FIELD

The present disclosure is generally related to virtualized computer systems, and more particularly, hot-plugging of hardware devices in virtualized computer systems.

BACKGROUND

Virtualization may be viewed as abstraction of some physical components into logical objects in order to allow running, for example, various operating systems concurrently and in isolation from other operating systems on one or more interconnected physical computer systems. Virtualization allows, for example, consolidating multiple physical servers into one physical server running multiple virtual machines (VMs) in order to improve the hardware utilization rate. Virtualization may be achieved by running a layer, often referred to as "hypervisor," above the hardware and below the VMs. A hypervisor may run directly on the server hardware without an operating system beneath it or as an application running under a traditional operating system. A hypervisor may abstract the physical layer and present this abstraction to VMs to use, by providing interfaces between the underlying hardware and virtual devices of VMs.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
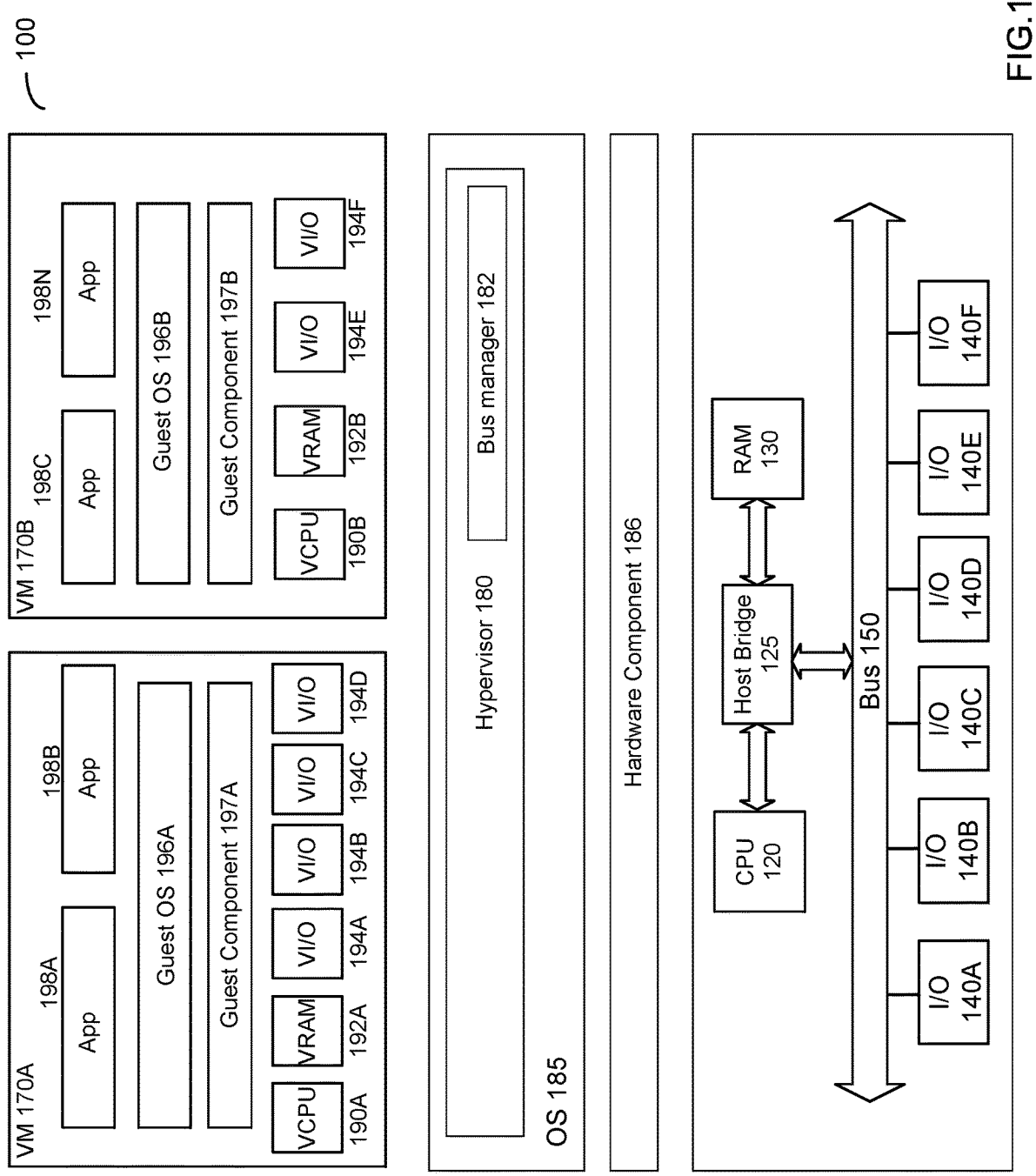
FIG. 1 depicts an illustrative computer system architecture, in accordance with one or more aspects of the present disclosure.

Described herein are methods and systems that enable hot-plugging of hardware devices in virtualized systems.

A computer bus is a communication system comprising hardware that transfers data between components inside a computer, or between computers. A computer bus conforming to the Peripheral Component Interconnect (PCI) specification can enable PCI-compliant hardware devices to be attached to the computer. Attached devices can take the form of an integrated circuit fitted onto the motherboard itself (called a planar device in the PCI specification) or an expansion card that fits into a slot installed on the motherboard. Examples of PCI cards used in personal computers and servers include network cards, sound cards, modems, USB ports, TV tuner cards and disk controllers.

The PCI specification can provide separate memory and I/O port address spaces for the hardware devices connected to the bus. A third address space, called PCI Configuration Space, can include memory-mapped device registers that may be used by one or more computer components (e.g., PCI Basic Input/Output System [BIOS], Read-Only Memory [ROM] BIOS, etc.) to query the device attributes, such as the device type, device identifier, and specifications of the system resources to be assigned to the device. In certain implementations, at startup time, the one or more computer components may query all PCI devices via PCI Configuration Space to identify the devices that are present and determine what system resources (memory space, I/O space, interrupt lines, etc.) each device needs. The one or more computer components may then allocate the system resources and notify the operating system (OS) of the allocated resources (e.g., by modifying the corresponding entries of Advanced Configuration and Power Interface [ACPI] tables).

The PCI specification supports device hot-plugging, which allows hardware devices to be attached to a PCI bus or removed from the system at any time during system operation. Upon detecting a hot-plugged device, the device component (e.g., PCI BIOS, etc.) may query the device via the PCI Configuration Space and allocate the system resources to the device. Upon detecting a device removal, the device component may release the system resources that were previously allocated by the device.

The PCI specification permits connecting multiple PCI buses by bus bridges to form a hierarchical tree-like structure. A host/PCI bridge connects the host processor to a root PCI bus at the top of the hierarchy. System resources that are allocated to hardware devices connected to PCI buses are associated with a corresponding resource address range (e.g., memory address range and/or I/O port address range) of the root PCI bus. Thus, a given memory address or I/O port number is uniquely associated with a certain hardware device and with the PCI bus sub-tree representing the path to that device.

The PCI specification allows multiple root PCI buses in a computer system; however, in conventional systems, hardware devices that are hot-pluggable may be supported by a single root PCI bus only (typically bus number zero, as specified by the host/PCI bridge). In non-uniform memory access (NUMA) multiprocessing systems, root PCI buses are in proximity to, and possibly attached to, at most one NUMA node. Moreover, a hardware device that is attached to a root PCI bus may be capable of performing certain functions (e.g., system boot, etc.) that the hardware device cannot perform when attached to a PCI bus that is not a root bus (referred to subsequently in this disclosure as a non-root PCI bus).

In the case of virtualized systems, and particularly the case in which a virtual machine (VM) has multiple virtual root buses, it would be beneficial if virtual devices could be hot-plugged into the extra virtual root buses, as this would allow multiple NUMA nodes of a multi-processing system to attach virtual devices to the VM simultaneously. The difficulty in doing so, however, is that it is not known in advance how large of an address range for a resource (e.g., memory, input/output, etc.) can be necessary for the device, and a device may have a large Base Address Registers (BAR) that involves a large address range.

Aspects of the present disclosure address the above noted and other deficiencies by providing methods and systems enabling multiple NUMA nodes to hot-plug devices into a VM simultaneously. In accordance with one or more aspects of the present disclosure, a hypervisor obtains a plurality of values, each representing a quantity of a resource (e.g., memory, input/output, etc.) for a corresponding virtual bus of a VM. The hypervisor receives a request for a system table (e.g., an ACPI table) from a guest component (e.g., virtualized firmware of the host system, where the host firmware can be defined as computer programs and modules that are stored in non-volatile memory devices and may include, for example, BIOS, Kickstart, RTAS, OpenWrt, etc.). The hypervisor determines a set of address ranges of the resource that are allocated for virtual devices attached to the virtual buses. The hypervisor then determines a set of available address ranges for attaching additional virtual devices. The hypervisor assigns to the virtual buses non-overlapping address ranges of the resource within the available set of address ranges. The hypervisor then notifies the guest component that the assigned address ranges are available for attaching additional devices. In one example, the notification comprises one or more system tables (e.g., ACPI tables, etc.) that include the assigned ranges for each virtual root bus, and the guest component passes control to the guest operating system (OS). The guest OS can then use the information in the system tables to determine what address ranges are reserved for hot-plugging.

In one implementation, the sizes of the allocated address ranges for the resource may vary in view of the resource quantities of the resource. In one aspect, the address ranges are allocated during a boot of the host computer system. In one example, the values for the resource quantities are obtained by the hypervisor via a command line parameter, a configuration file, a message sent to the hypervisor, etc. In one implementation, the assigning of the resource address ranges is in view of one or more parameters specified by a management system (e.g., a server management system, a network management system, an application performance management system, etc.).

Accordingly, aspects of the present disclosure enable virtual devices to be hot-plugged into multiple virtual root buses of a VM. In multi-processing systems, this will allow virtual devices to be hot-plugged on all the root buses, thereby leveraging proximity to the NUMA node.

Various aspects of the above referenced methods and systems are described in details herein below by way of examples, rather than by way of limitation.

FIG. 1 depicts an illustrative computer system 100, in accordance with one or more aspects of the present disclosure. As shown in FIG. 1, computer system 100 comprises one or more processors 120 communicatively coupled, via a host bridge 125, to system memory 130 and hardware bus 150. Various I/O devices 140A-140F, such as network cards, sound cards, modems, USB ports, TV tuner cards and/or disk controllers, may be attached to hardware bus 150. In one implementation, hardware bus 150 is a Peripheral Component Interconnect (PCI) bus.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Computer system 100 may run one or more virtual machines 170A-170B, by executing a layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and provide this abstraction to virtual machines 170A-170B as virtual devices. In accordance with one or more aspects of the present disclosure, hypervisor 180 may include a bus manager component 182 that performs one or more functions of methods 300, 400 and 500 (e.g., determining an address range of a resource that is allocated for virtual devices attached to virtual root buses of the VM, determining an available address range for attaching additional virtual devices to virtual buses etc.), as described in detail below with respect to FIGS. 3 through 5.

In one implementation, virtual machine 170 executes a guest operating system 196 utilizing underlying virtual processors (also referred to as virtual central processing units (vCPUs)) 190, virtual memory 192, and virtual I/O devices 194A-194N, and executes guest component 197 emulating the hardware component 186 of the host computer system. One or more applications 198A-198N may be running on a virtual machine 170 under guest operating system 196.

In various illustrative examples, processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device virtualization may be implemented by intercepting virtual machine memory read/write and/or input/output (I/O) operations with respect to certain memory and/or I/O port ranges, and by routing hardware interrupts to a virtual machine associated with the corresponding virtual device.

Figure 2:
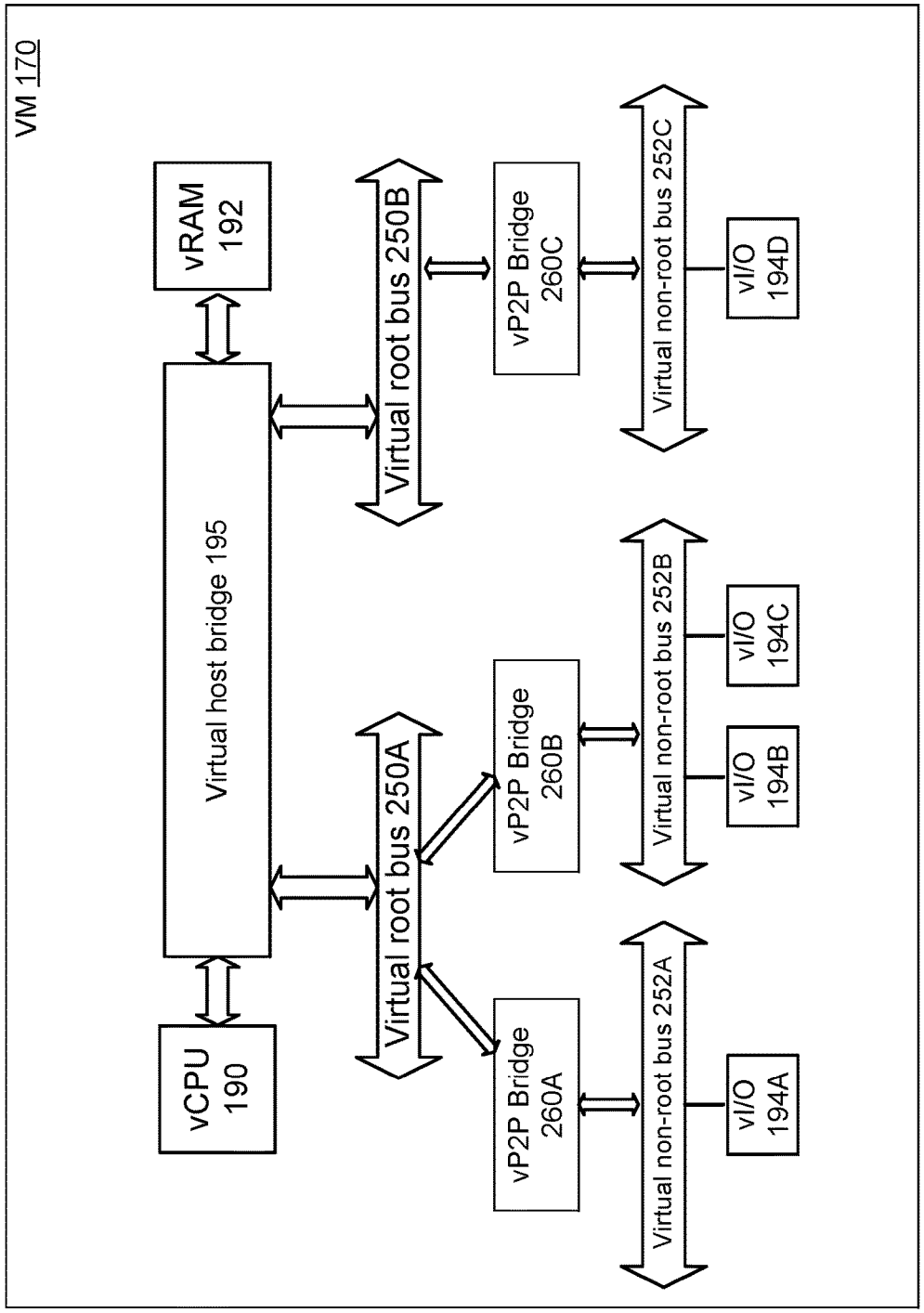
FIG. 2 depicts an illustrative virtual machine operating in accordance with one or more aspects of the present disclosure.

FIG. 2 schematically illustrates an example virtual machine 170, in accordance with one or more aspects of the present disclosure. Bus manager component 182 of FIG. 1 may be programmed to intercept virtual machine 170 memory read/write and/or input/output (I/O) operations with respect to certain memory and/or I/O port ranges in order to make virtual devices 194A-194D visible to virtual machine 170. In implementations where hardware bus 150 is a PCI bus, virtual devices 194A-194D are virtual PCI devices and the memory and/or I/O port ranges are within the PCI Configuration Space.

In an illustrative example, bus manager component 182 may notify virtual machine 170 of the presence of virtual root buses 250. Bus manager component 182 may further present to virtual machine 170, by intercepting virtual machine memory read/write and/or input/output (I/O) operations with respect to certain memory and/or I/O port ranges, virtual devices 194A-194D attached to virtual non-root buses 252, which are attached to virtual root buses 250 via virtual PCI-to-PCI bridges 260.

The guest component 197 being executed by virtual machine 170 may, at the virtual machine startup, scan virtual root PCI buses 250B. Bus manager component 182 may intercept the virtual machine memory and/or I/O port read operations and present, to virtual machine 170, virtual PCI-to-PCI bridges 260 associated with virtual root buses 250, and further present non-root virtual buses 252 connected to the other side of virtual PCI-to-PCI (vP2P) bridges 260.

Responsive to detecting virtual PCI-to-PCI bridges 260 associated with root buses 250, the guest component 197 may identify virtual non-root buses 252 that are communicatively coupled to the other side of PCI-to-PCI bridges 260. The guest component 197 may then scan the identified virtual PCI buses 252. Bus manager component 182 may intercept the virtual machine memory and/or I/O port read operations and present, to virtual machine 170, one or more virtual devices connected to virtual non-root buses bus 252.

The guest component 197 may query virtual devices to identify the virtual devices that are present and determine what system resources (memory space, I/O space, interrupt lines, etc.) each virtual device needs. In PCI-based examples, virtual PCI devices reside within a PCI configuration space. For each virtual device 194A-194D detected on virtual non-root buses 252, the guest component 197 may add, to a resource pool (memory address range or I/O port number range) associated with vP2P bridge 260, the system resources allocated to virtual device 194. The guest component 197 may allocate the resources for multiple virtual devices attached to virtual buses 252 using contiguous address ranges (e.g., memory address ranges or I/O port number ranges), thus optimizing the efficiency of system resource allocation.

Figure 3:
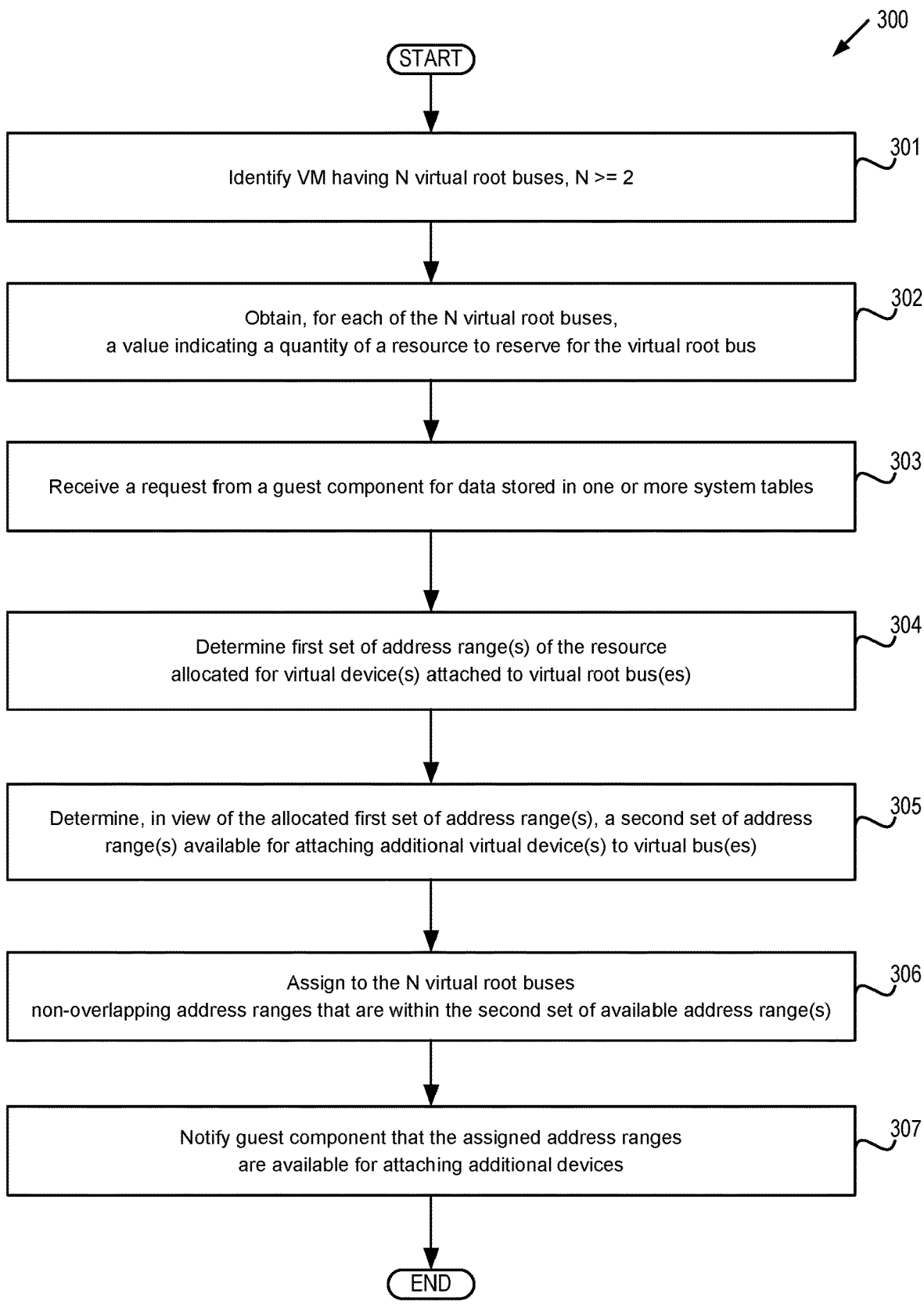
FIG. 3 depicts a flow diagram of one example of a first method for enabling hot-plugging of devices in virtualized systems, in accordance with one or more aspects of the present disclosure.

FIG. 3 depicts a flow diagram of one example of a first method 300 for enabling hot-plugging of devices in virtualized systems that include a VM with multiple virtual root buses, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 300 is performed by hypervisor 180 of computer system 100 of FIG. 1, and one or more blocks of the method may be performed by bus manager 182 of hypervisor 180. It should be noted that in some implementations blocks depicted in FIG. 3 may be performed simultaneously or in a different order than that depicted.

At block 301, a virtual machine 170 having N virtual root buses is identified, where N is a positive integer greater than one. At block 302, for each of the N virtual root buses, hypervisor 180 obtains a value that indicates a quantity of a resource (e.g., memory, input/output, etc.) to reserve for the virtual root bus. In one implementation, the values for the resource quantities are obtained by the hypervisor via a command line parameter, a configuration file, a message sent to the hypervisor (e.g., from a management system [not depicted in FIG. 1]), etc.

In one implementation, the sizes of the allocated address ranges may vary depending on the quantities of the resource. In one example, the address ranges are allocated during a boot of host computer system 100.

At block 303, hypervisor 180 receives a request from guest component 197 for data stored in one or more system tables (e.g., Advanced Configuration and Power Interface (APCI) tables, etc.). At block 304, hypervisor 180 determines a first set of address range(s) of the resource that are allocated for virtual device(s) attached to virtual root bus(es). It should be noted that each virtual device might be mapped to a hardware device, or might be an emulated device.

In one implementation, hypervisor 180 obtains the resource address range(s) from an area of memory that stores a set of emulated registers writeable by guest component 197. In examples where hardware bus 150 is a PCI bus and input/output devices 140 are PCI devices, the area of memory is a Peripheral Component Interconnect (PCI) configuration space.

At block 305, hypervisor 180 determines, in view of the allocated first set of address range(s), a second set of address range(s) available for attaching additional virtual device(s) to virtual root buses of VM 170. At block 306, hypervisor 180 assigns to the N virtual root buses non-overlapping address ranges that are within the second set of available address range(s). It should be noted that a particular non-overlapping address range might be the full corresponding available address range, while in some other examples a non-overlapping address range might be a subset of the corresponding available address range. It should further be noted that in some examples, two non-overlapping address ranges might be within the same available address range, while in some other examples each of the non-overlapping address ranges might correspond to a respective one of the available address ranges. In one implementation, the non-overlapping address ranges are assigned in view of one or more parameters specified by a management system (e.g., a server management system, a network management system, an application performance management system, etc.).

At block 307, hypervisor 180 notifies guest component 197 that the assigned address ranges are available for attaching additional devices. In one implementation, the notifying involves adding an entry to a system table that specifies one or more of the assigned address ranges. In examples where the system table is an ACPI table, an entry might be added to the ACPI table by populating N−1 Current Resource Setting (CRS) objects, where each CRS object corresponds to a respective one of the extra virtual root bridges. For example, in the illustrative VM 170 depicted in FIG. 2, where there are two virtual root buses 250A and 250B (i.e., N=2) and 250B is the extra virtual root bus, a CRS object corresponding to virtual bridge 260C can be populated.

In one example, the notification comprises one or more system tables (e.g., ACPI tables, etc.) that include the assigned ranges for each virtual root bus, and the guest component passes control to the guest operating system (OS). After block 307 is performed, guest OS 196 can subsequently use the assigned ranges for hot-plugging of new virtual devices (i.e., attaching the new virtual devices to virtual buses).

Figure 4:
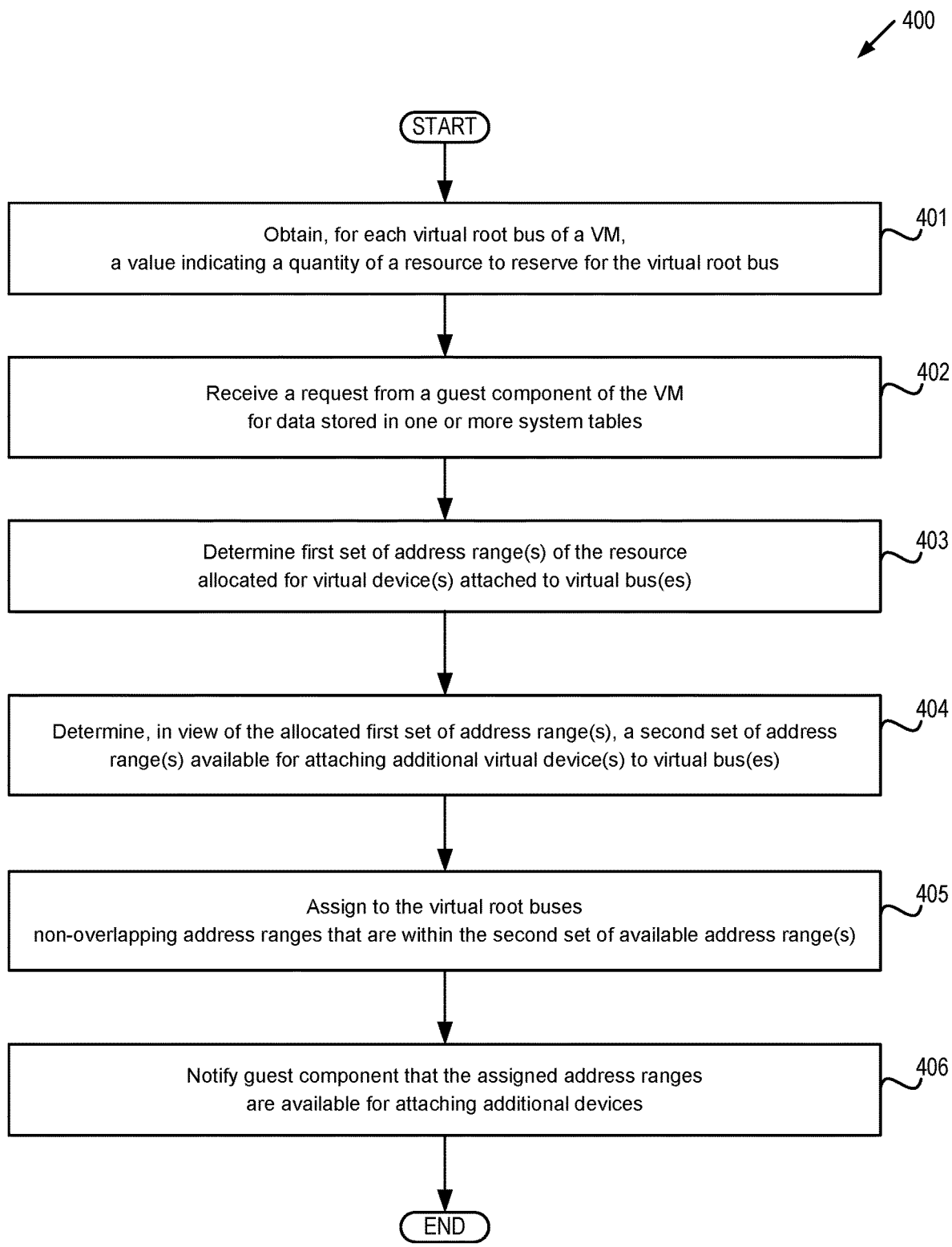
FIG. 4 depicts a flow diagram of one example of a second method for enabling hot-plugging of devices in virtualized systems, in accordance with one or more aspects of the present disclosure.

FIG. 4 depicts a flow diagram of one example of a second method 400 for enabling hot-plugging of devices in virtualized systems that include a VM with multiple virtual root buses, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 400 is performed by hypervisor 180 of computer system 100 of FIG. 1, and one or more blocks of the method may be performed by bus manager 182 of hypervisor 180. It should be noted that in some implementations blocks depicted in FIG. 4 may be performed simultaneously or in a different order than that depicted.

At block 401, hypervisor 180 obtains, for each virtual root bus of a VM 170, a value that indicates a quantity of a resource (e.g., memory, input/output, etc.) to reserve for the virtual root bus. At block 402, hypervisor 180 receives a request from a guest component 197 of VM 170 for data stored in one or more system tables (e.g., Advanced Configuration and Power Interface (APCI) tables, etc.).

At block 403, hypervisor 180 determines a first set of address range(s) of the resource that are allocated for virtual device(s) attached to virtual bus(es). At block 404, hypervisor 180 determines, in view of the allocated first set of address range(s), a second set of address range(s) available for attaching additional virtual device(s) to virtual bus(es) of VM 170.

At block 405, hypervisor 180 assigns to the virtual root buses non-overlapping address ranges that are within the second set of available address range(s). At block 406, hypervisor 180 notifies guest component 197 that the assigned address ranges are available for attaching additional devices. In one example, the notification comprises one or more system tables (e.g., ACPI tables, etc.) that include the assigned ranges for each virtual root bus, and guest component 197 passes control to guest operating system 196.

Figure 5:
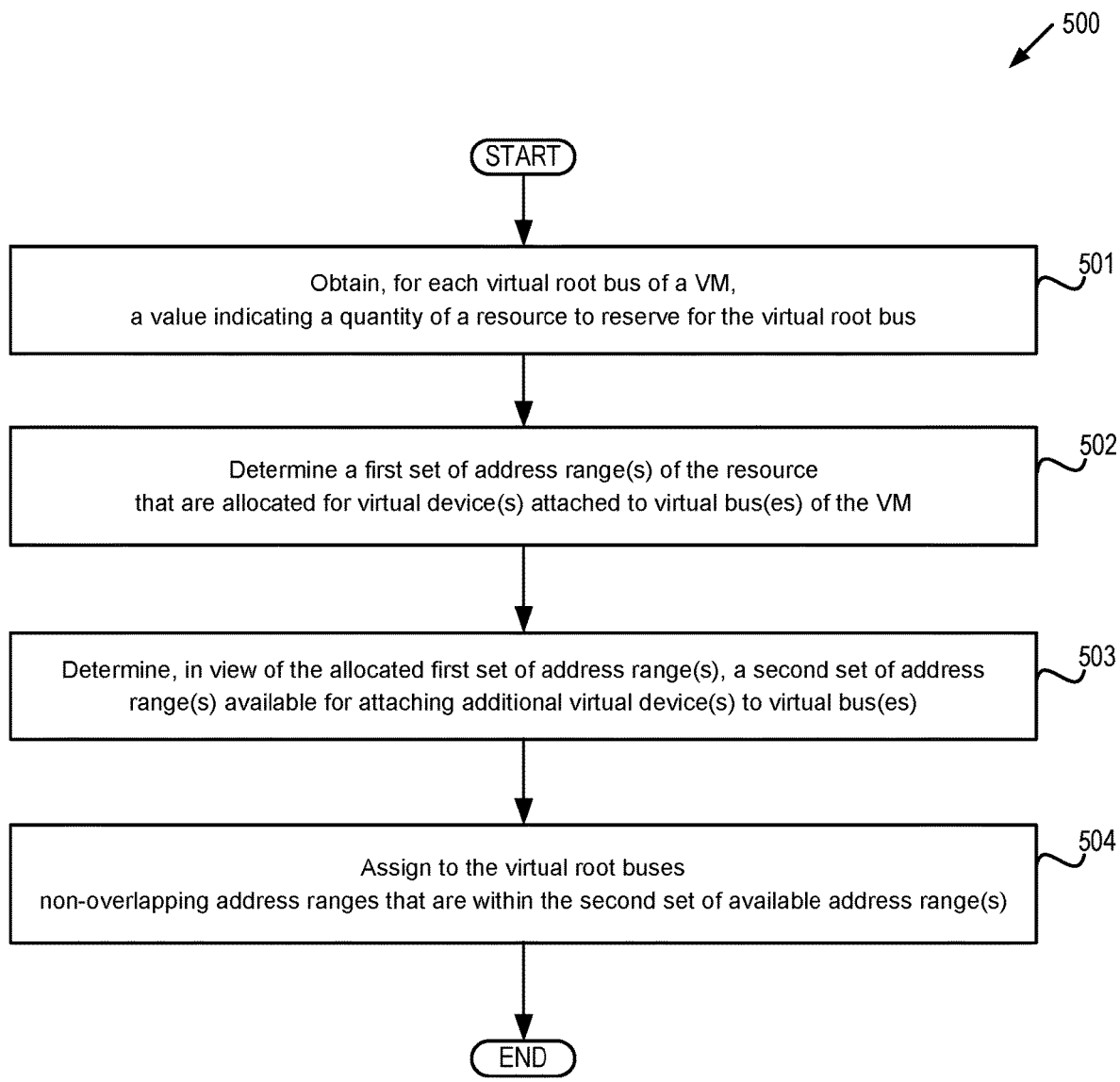
FIG. 5 depicts a flow diagram of one example of a second method for enabling hot-plugging of devices in virtualized systems, in accordance with one or more aspects of the present disclosure.

FIG. 5 depicts a flow diagram of one example of a third method 500 for enabling hot-plugging of devices in virtualized systems that include a VM with multiple virtual root buses, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 500 is performed by hypervisor 180 of computer system 100 of FIG. 1, and one or more blocks of the method may be performed by bus manager 182 of hypervisor 180. It should be noted that in some implementations blocks depicted in FIG. 5 may be performed simultaneously or in a different order than that depicted.

At block 501, hypervisor 180 obtains, for each virtual root bus of a VM 170, a value that indicates a quantity of a resource (e.g., memory, input/output, etc.) to reserve for the virtual root bus. At block 502, hypervisor 180 determines a first set of address range(s) of the resource for virtual device(s) attached to virtual bus(es).

At block 503, hypervisor 180 determines, in view of the first set of allocated address range(s), a second set of address range(s) available for attaching additional virtual device(s) to virtual bus(es) of VM 170. At block 504, hypervisor 180 assigns to the virtual root buses non-overlapping address ranges that are within the second set of available address range(s).

Figure 6:
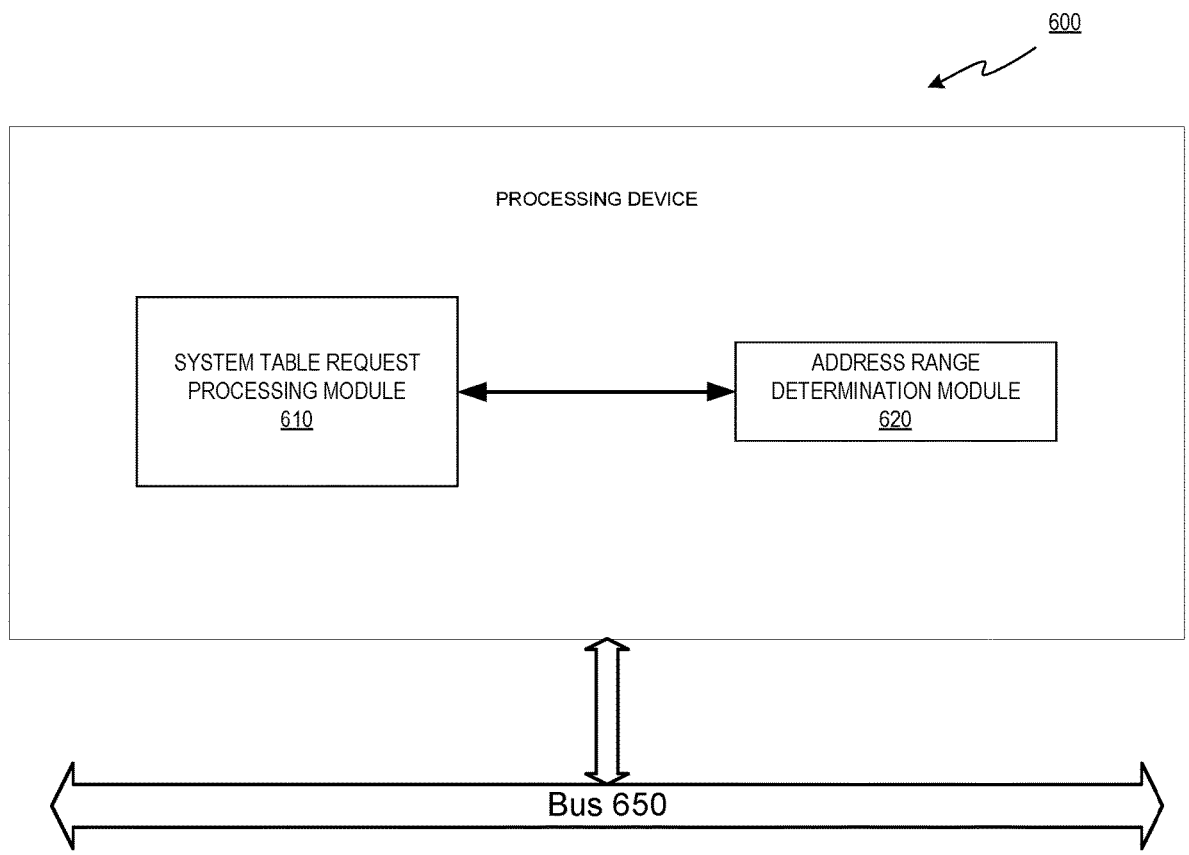
FIG. 6 depicts a block diagram of an illustrative computer system operating in accordance with one or more aspects of the disclosure.

FIG. 6 depicts a block diagram of an illustrative computer system 600 operating in accordance with one or more aspects of the disclosure. In various illustrative examples, computer system 600 may correspond to a computing device within system architecture 100 of FIG. 1. Computer system 600 comprises a hardware bus 650 and a processing device that may include components to enable hot-plugging of devices for a VM with multiple virtual root buses. In one example, the processing device may include a system table request processing module 610 and an address range determination module 620.

In one implementation, system table request processing module 610 obtains respective values representing respective quantities of a resource for a plurality of virtual root buses of a VM. System table request processing module 610 receives from a guest component of the VM a request for data stored in a system table (e.g., an ACPI table, etc.). Address range determination module 620 determines a first set of address ranges of the resource for virtual device(s) attached to at least one of the plurality of virtual root buses. Address range determination module 620 subsequently determines, in view of the first set of allocated address ranges, a second set of address ranges of the resource available for attaching additional virtual device(s) to at least one of the plurality of virtual root buses. Address range determination module 620 assigns to the plurality of virtual root buses, non-overlapping respective address ranges of the resource that are within the second set of address ranges. System table request processing module 610 then notifies the guest component that the second set of address ranges of the resource are available for attaching additional devices.

Figure 7:
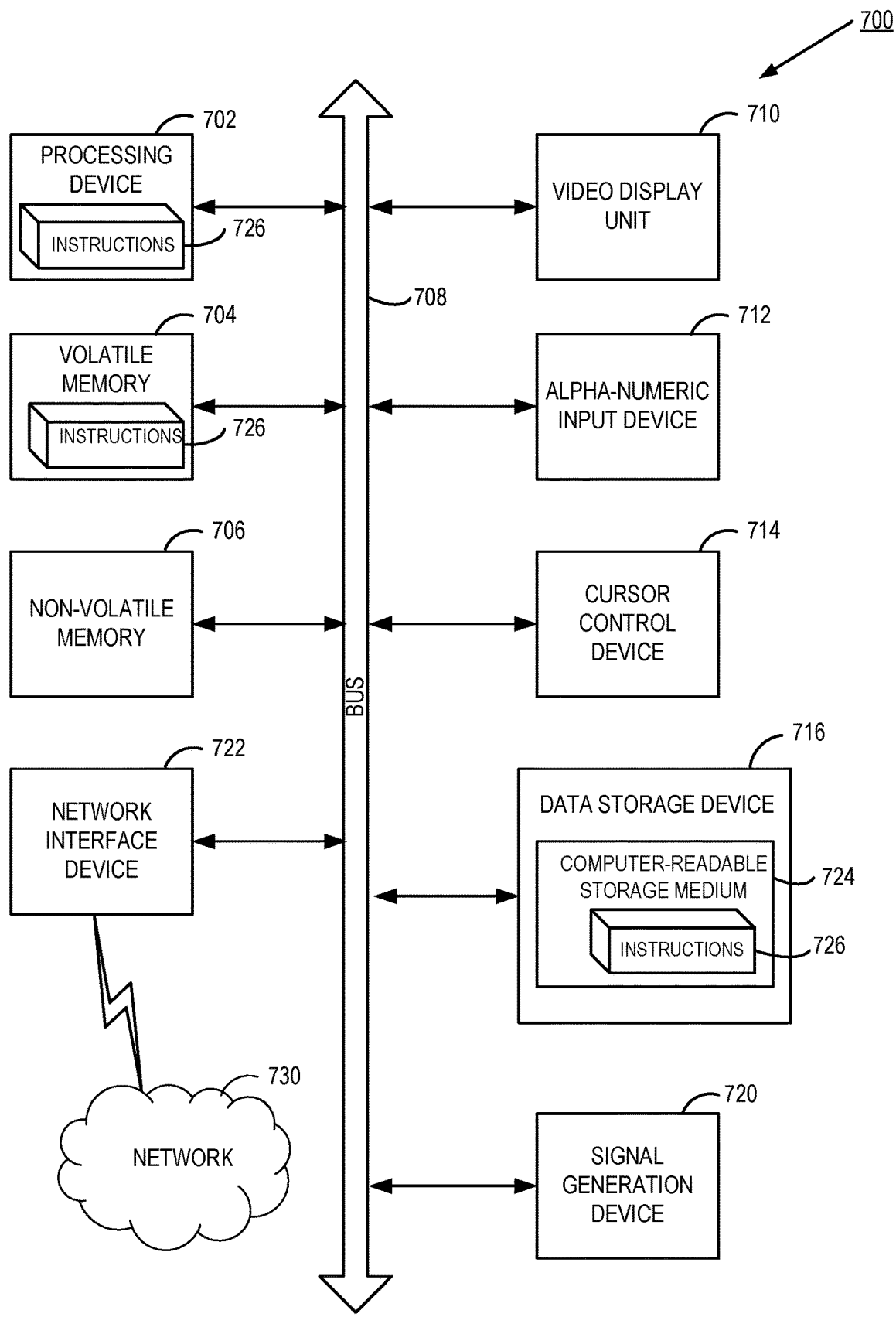
FIG. 7 depicts a block diagram of another illustrative computer system operating in accordance with one or more aspects of the disclosure.

FIG. 7 depicts a block diagram of another computer system operating in accordance with one or more aspects of the present disclosure. In various illustrative examples, computer system 700 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network 730, such as a Local Area Network (LAN), an intranet, an extranet, or the Internet) to other computer systems. Computer system 700 may operate in the capacity of a server or a client computer in a client-server environment, or as a peer computer in a peerto-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300, 400, and/or 500 of FIGS. 3 through 5.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "receiving," "executing," "identifying," "obtaining," "determining," "assigning," "notifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   determining, by a processing device executing a hypervisor, a first set of address ranges of a resource that are allocated to one or more virtual devices attached to at least one of a plurality of virtual buses of a virtual machine;
   determining, by the processing device executing the hypervisor, in view of the first set of address ranges, a second set of address ranges of the resource available for attaching one or more additional virtual devices to at least one of the plurality of virtual buses; and
   assigning, to the plurality of virtual buses, by the processing device executing the hypervisor, non-overlapping respective address ranges of the resource that are within the second set of address ranges.

2. The method of claim 1 wherein subsequent to the assigning, the method further comprises attaching a virtual device to at least one of the plurality of virtual buses or a non-root virtual bus that is a descendant of one of the plurality of virtual buses.

3. The method of claim 1 further comprising adding to a system table, by the hypervisor, an entry that specifies at least one of the non-overlapping respective address ranges.

4. The method of claim 3 wherein the system table is an Advanced Configuration and Power Interface (APCI) table.

5. The method of claim 1 wherein the determining of the first set of address ranges of the resource comprises obtaining the first set of address ranges from an area of memory that stores a set of emulated registers writeable by a guest component of the VM.

6. The method of claim 5 wherein the area of memory is a Peripheral Component Interconnect (PCT) configuration space.

7. The method of claim 1 wherein the first set of address ranges of the resource is allocated during a boot of a host computer system.

8. The method of claim 1 further comprising:
receiving, from a first non-uniform memory access (NUMA) node of a multi-processing system, a first request to attach a first virtual device to the VM;
attaching, in response to the first request, the first virtual device to a first virtual bus of the VM;
receiving, from a second NUMA node of the multi-processing system, a second request to attach a second virtual device to the VM;
attaching, in response to the second request, the second virtual device to a second virtual bus of the VM while the first virtual device remains attached to the first virtual bus.

9. A host computer system comprising:
a hardware bus; and
a processing device, operatively coupled to the hardware bus to:
determine, by a hypervisor, a first set of address ranges of a resource that are allocated for one or more virtual devices attached to at least one of a plurality of virtual buses of a virtual machine;
determine, by the hypervisor, in view of the first set of address ranges, a second set of address ranges of the resource available for attaching one or more additional virtual devices to at least one of the plurality of virtual buses; and
assign to the plurality of virtual buses, by the hypervisor, non-overlapping respective address ranges of the resource that are within the second set of address ranges.

10. The host computer system of claim 9 wherein the hardware bus is a Peripheral Component interconnect (PCI) bus.

11. The host computer system of claim 9 wherein the resource comprises at least one of a memory or an input/output device.

12. The host computer system of claim 9 wherein the processing device is further to:
receive, from a first non-uniform memory access (NUMA) node of a multi-processing system, a first request to attach a first virtual device to the virtual machine (VM);
attach, in response to the first request, the first virtual device to a first virtual bus of the VM;
receive, from a second NUMA node of the multi-processing system, a second request to attach a second virtual device to the VM; and
attach, in response to the second request, the second virtual device to a second virtual bus of the VM while the first virtual device remains attached to the first virtual bus.

13. The host computer system of claim 9 wherein to assign the first set of address ranges of the resource is performed in view of one or more parameters specified by a management system.

14. The host computer system of claim 9 wherein to obtain is performed by the hypervisor via a command line parameter, a configuration file, or a message sent to the hypervisor.

15. A non-transitory computer-readable storage medium comprising instructions that when executed by a processing device of a host computer system, cause the processing device to execute a hypervisor to:
obtain, by the processing device executing the hypervisor of the host computer system, a value representing a quantity of a resource for a virtual root bus of a virtual machine (VM);
allocate, by the hypervisor, a first address range of the resource for one or more virtual devices attached to the virtual root bus, wherein the first address range is allocated in view of the value;
determine, by the hypervisor, in view of the first address range, a second address range of the resource available for attaching one or more additional virtual devices to the virtual root bus; and
assign to the virtual root bus, by the hypervisor, one or more address ranges of the resource that are within the second address range.

16. The non-transitory computer-readable storage medium of claim 15 wherein the instructions further cause the processing device to execute the hypervisor to:
notify a guest component of the virtual machine that the second address range of the resource are available for attaching additional devices.

17. The non-transitory computer-readable storage medium of claim 16 wherein subsequent to the notifying, a virtual device is attached to at least one of the plurality of virtual root bus or a non-root virtual bus.

18. The non-transitory computer-readable storage medium of claim 16 wherein to notify the guest component, the processing device to execute the hypervisor to add, to a system table, an entry that specifies at least one of the non-overlapping respective address ranges.

19. The non-transitory computer-readable storage medium of claim 16 wherein the hypervisor to obtain the first address range of the resource from an area of memory that stores a set of emulated registers writeable by the guest component.

20. The non-transitory computer-readable storage medium of claim 15 wherein to assign is performed in view of one or more parameters specified by a management system.

* * * * *